(12) United States Patent
Sadeghian Marnani et al.

(10) Patent No.: US 10,948,458 B2
(45) Date of Patent: Mar. 16, 2021

(54) METHOD OF AND SYSTEM FOR PERFORMING DETECTION ON OR CHARACTERIZATION OF A SAMPLE

(71) Applicant: Nederlandse Organisatie voor toegepast-natuurwetenschappelijk onderzoek TNO, s-Gravenhage (NL)

(72) Inventors: Hamed Sadeghian Marnani, Nootdorp (NL); Lukas Kramer, Berkel en Rodenrijs (NL); Maarten Hubertus van Es, Voorschoten (NL)

(73) Assignee: Nederlandse Organisatie voor toegepast-natuurwetenschappelijk onderzoek TNO, 's-Gravenhage (NL)

( * ) Notice: Subject to any disclaimer, the term of this patent is extended or adjusted under 35 U.S.C. 154(b) by 0 days.

(21) Appl. No.: 16/477,280

(22) PCT Filed: Jan. 11, 2018

(86) PCT No.: PCT/NL2018/050020
§ 371 (c)(1),
(2) Date: Jul. 11, 2019

(87) PCT Pub. No.: WO2018/132005
PCT Pub. Date: Jul. 19, 2018

(65) Prior Publication Data
US 2019/0383774 A1 Dec. 19, 2019

(30) Foreign Application Priority Data

Jan. 13, 2017 (EP) .................................. 17151429

(51) Int. Cl.
*G01N 29/06* (2006.01)
*G01N 21/17* (2006.01)
(Continued)

(52) U.S. Cl.
CPC ..... *G01N 29/0681* (2013.01); *G01N 21/1702* (2013.01); *G01N 29/2418* (2013.01); *G01N 29/265* (2013.01); *G01Q 60/38* (2013.01)

(58) Field of Classification Search
CPC ........ G01Q 10/00; G01Q 10/02; G01Q 10/04; G01Q 20/00; G01Q 20/02; G01Q 30/20; G01Q 90/00
(Continued)

(56) References Cited

U.S. PATENT DOCUMENTS

| 5,948,972 A | * | 9/1999 | Samsavar | G01B 3/008 |
| | | | | 73/105 |
| 6,075,585 A | * | 6/2000 | Minne | G01Q 10/06 |
| | | | | 355/71 |

(Continued)

OTHER PUBLICATIONS

M T Cuberes et al., "Nonlinear Detection of Ultrasonic Vibration of AFM Cantilevers in and out of Contact with the Sample," Institute of Physics Publishing, Nanotechnology, vol. 12, No. 1, pp. 53-59, XP020066751. (Mar. 1, 2001). (Year: 2001).*

(Continued)

*Primary Examiner* — Jason L McCormack
(74) *Attorney, Agent, or Firm* — Leydig, Voit & Mayer, Ltd.

(57) ABSTRACT

The present document relates to a anatomic force microscope comprising a probe comprising a probe tip configured to sense a sample disposed proximate to the probe tip, a detector to detect a deflection of the probe tip, an actuator coupled to the probe and configured to move the probe in a sense state with the sample at a predetermined force set point and a vibrator in communication with the sample to provide a vibration to the sample, the vibration comprising a modulation frequency, wherein the acoustic vibrator is configured to provide the vibration in a modulation period after an initial sense period without modulation and wherein the (Continued)

probe is moved during or after said modulation period to a successive sample position over said sample while moving the probe in a non-contact state.

11 Claims, 7 Drawing Sheets

(51) Int. Cl.
G01N 29/24 (2006.01)
G01N 29/265 (2006.01)
G01Q 60/38 (2010.01)

(58) Field of Classification Search
USPC .......................... 850/1, 2, 3, 633, 34, 35, 63
See application file for complete search history.

(56) References Cited

U.S. PATENT DOCUMENTS 6,305,226 B1 10/2001 Barber et al.
2015/0338437 A1* 11/2015 Stan ........................ G01Q 10/00
850/1

OTHER PUBLICATIONS

M T Cuberes et al., "Nonlinear Detection of Ultrasonic Vibration of AFM Cantilveres in and out of Contact wiht the Sample," Institute of Physics Publishing, Nanotechnology, vol. 12, No. 1, pp. 53-59, CP020066751. (Mar. 1, 2001). (Year: 2001).*

M T Cuberes et al., "Nonlinear Detection of Ultrasonic Vibration of AFM Cantilevers in and out of Contact with the Sample", Institute of Physics Publishing, Nanotechnology, vol. 12, No. 1, pp. 53-59, CP020066751. (Mar. 2001). (Year: 2001).*

Shekhawat et al., "Nanoscale Imaging of Buried Structures via Scanning Near-Field Ultrasound Holography," ScienceMag, vol. 310, pp. 89-92 (Oct. 7, 2005) www.sciencemag.org.

Stan et al., "Intermittent Contact Resonance Atomic Force Microscopy," Nanotechnology 25 (2014) 245702 (8pp), pp. 1-8 (published May 23, 2014).

Tetard et al., "Imaging Nanoparticles in Cells by Nanomechanical Holography," Nature Nanotechnology, vol. 3, pp. 501-505 (Aug. 2008).

X.L. Zhou et al., "Mapping Nanoscale Domain Patterns in Ferroelectric Ceramics by Atomic Force Acoustic Microscopy and Piezoresponse Force Microscopy," Journal of Applied Physics, vol. 113, No. 18, pp. 187214-1 to 187214-7, XP012174088 (May 14, 2013).

M T Cuberes et al., "Nonlinear Detection of Ultrasonic Vibration of AFM Cantilevers In and Out of Contact with the Sample," Institute of Physics Publishing, Nanotechnology, vol. 12, No. 1, pp. 53-59, XP020066751 (Mar. 1, 2001).

European Patent Office, International Search Report in corresponding International Application No. PCT/NL2018/050020, dated Apr. 11, 2018 (3 pages).

* cited by examiner

METHOD OF AND SYSTEM FOR PERFORMING DETECTION ON OR CHARACTERIZATION OF A SAMPLE

CROSS-REFERENCE TO RELATED APPLICATIONS

This patent application is a U.S. National Phase of PCT International Application No. PCT/NL2018/050020, filed Jan. 11, 2018, which claims priority to European Application No. 17151429.2, filed Jan. 13, 2017, which are both expressly incorporated by reference in their entireties, including any references contained therein.

FIELD OF THE INVENTION

The present invention is directed at a method for mapping surface and subsurface characteristics of a sample. The invention is further directed at a method for performing atomic force microscopy, and at an atomic force microscopy system.

BACKGROUND

In recent advances of atomic force microscopy so called subsurface probe microscopy (also known as subsurface AFM) has shown unique capabilities to measure nanostructures buried below the surface. Subsurface AFM is typically operated in contact-mode feedback wherein a topography image is obtained using contact-mode feedback of the low-frequency (<2 kHz) portion of the cantilever deflection signal, while simultaneously recording a subsurface image from the high frequency amplitude and phase at modulation frequency.

The schematic of the working principle of this prior art method is shown in FIG. 1.

Since the subsurface AFM is operated in the contact mode, it has the disadvantages that it can damage the sample, especially since higher force application is needed to get high signal to noise ratios.

Higher set point force will result in higher shear forces which are known to damage the sample and may cause drift during the measurement in the subsurface signal. In US20150338437 an atomic force microscopy method is described wherein an intermittent contact resonance atomic force microscope is configured to modulate a cantilever at contact resonance frequency and modulate a sample at a scan modulation frequency while intermittently subjecting a force to a sample from the cantilever to obtain imaging data for determination of materials properties (e.g., modulus, stiffness, and the like) for a surface and sub-surface portion of sample. Intermittent contact resonance has shown however to reduce the damage issue, but not fully. However, forces are not well specified in this mode and quantitative (subsurface) imaging is therefore difficult. Moreover, it does not solve the problem of coupling surface and subsurface information.

SUMMARY OF THE INVENTION

It is an object of the present invention to provide an atomic force microscopy method, which method is time efficient and accurate for mapping surface and subsurface characteristics of a sample.

To this end, there is provided herewith an atomic force microscope comprising: a probe comprising a probe tip configured to sense a sample disposed proximate to the probe tip, a detector to detect a deflection of the probe tip, an actuator coupled to the probe and configured to move the probe in a sense state with the sample at a predetermined force set point and a vibrator in communication with the sample to provide a vibration to the sample, the vibration comprising a modulation frequency, wherein the acoustic vibrator is configured to provide the vibration in a modulation period after an initial sense period without modulation and wherein the probe is moved during or after said modulation period to a successive sample position over said sample while moving the probe in a non-contact state.

In another aspect, there is provided a method for performing atomic force microscopy, the method comprising providing an atomic force microscope comprising a probe configured to sense a sample disposed proximate to the probe, a sample disposed proximate to the probe, and a vibrator in communication with the sample to provide a vibration to the sample, the vibration comprising a modulation frequency, subjecting the sample to the vibration and modulating the sample at the modulation frequency to perform atomic force microscopy, wherein the vibration is provided in a modulation period after an initial sense period without modulation and wherein the probe is moved during or after said modulation period to a successive sample position over said sample while moving the probe in a non-contact state.

By providing the method and system accordingly, surface and subsurface topography can be captured in a fully decoupled way. In practice it thereby prevents that any surface topography such as particles, defects etc. will change the tip-sample boundary condition, which could influence the subsurface signal. This influence is seen as coupling of the surface and subsurface and it is almost impossible to fully decouple the two images without loosing of information.

In contrast to the prior art, a non-resonant cantilever probe is used, that first reaches a surface with a defined set point force, carries out a measurement in an initial sense period without modulation and subsequently after capturing the topography information, collecting subsurface information in a modulation period of the vibrator subsequent to the initial sense period. In the initial sense period the surface topology is measured at a fixed set point force in either contact or non-contact region (see FIG. 2), by lowering the cantilever probe from a fixed z-height. In the modulation period, subsurface measurements can be carried out with vibrations in MHz range, to measure viscoelastic contract mechanism. This modulation period can be measured at a second contact force afterwards but is in the contact region. Normally, for reasons of efficiency both topography and subsurface will be measured at the same set point force (in a repulsive, contact region).

Subsurface measurements carried out in GHz range to measure a wave propagation contrast mechanism can be carried out in the non-contact region. For efficiency preferably at the same force as the topography measurement.

In between the phases, where the probe is moved to a new successive sample position, the cantilever is retracted to the fixed z-height. Approaching and retraction can be carried out with conventional means, eg. a piezo element or by direct actuation on the cantilever (electrostatically or thermally). Such methods may have a smaller z-range however, this need not be limiting in this application.

This method may have the following advantages: during a subsurface measurement the probe is positioned near the surface and requires a certain measurement time at a pixel. In this phase a continuous amplitude/frequency modulation is not suitable. Also contact-mode AFM is not suitable, because it damages the surface while moving laterally. In contrast to the prior art, the deformation forces on the sample are now minimized. In particular, shear forces are minimized, as the sample is not moved during the time the tip is in contact—so shear forces are substantially zero. Deformation in z can still be large (may be needed for viscoelastic subsurface imaging) but can be well controlled to be below damaging threshold. When a large step is encountered in the profile of a sample, e.g. for a sample with a high aspect ratio surface profile, the required scanning volume in amplitude/frequency modulation mode can be high. Therefore the mode requires a measurement frequency below the resonant frequency, or a combination between 'slow' approach and small amplitude frequency/amplitude modulation.

Furthermore, corrections can be carried out during a single approach curve. Conventional peak force tapping in contrast only does feedback in between curves based on 'peak force' during a previous curve. Thus, in this new mode correction is done for the current measurement pixel and not only for the next measurement pixel as in conventional peak-force tapping mode.

The present invention provides an atomic force microscopy (AFM) method with an ultrasonic force microscopy (UFM), or a heterodyne force microscopy (HFM), or other atomic force acoustic microscopy method to simultaneously perform binding strength measurements and surface topography mapping. To achieve this, the present invention performs AFM by scanning the surface of the element with a probe, while additionally applying an acoustic vibration signal to the semiconductor element using a transducer.

Therefore, the present detection method enables to provide a stiffness map of the sample, a surface topography of the sample, or a combination. It can provide a three-dimensional stiffness or visco elasticity of the sample. The method may be performed at high throughput.

In accordance with various embodiments, the step of monitoring the probe tip motion for mapping the surface of the semiconductor element comprises at least one of: using a first fraction of the output signal, wherein the first fraction of the output signal at least includes output signal components having a frequency below a first frequency; or using a feedback signal indicative of height corrections of the probe tip relative to the surface of the sample; or obtaining, using a z-level sensor, height measurements of the height of the probe tip relative to the sample surface. For example, an analyzer system or control system analyzes a first fraction of the output signal which includes low frequency (and also DC or static) signal components, to obtain the required information for performing surface topography mapping. Moreover, such information may be obtained from a feedback signal that controls the height of the scan head or the probe above the surface and from which height corrections may be obtained. Another option is to use an additional z-level sensor to measure the height of the probe or the height corrections. There are various possible implementations that enable to obtain this information.

In further non limiting example, the acoustic vibration signal comprises a carrier wave signal having a carrier frequency and a modulation signal having a modulation frequency. Here, upon controlling the setpoint force, the modulation frequency may be controlled such as to optimize an output signal strength of the output signal. This may be performed optionally in combination with the tuning of the setpoint force value as explained above. The tuning of the modulation frequency to the setpoint force is based on the insight that by changing the setpoint force value, the contact resonance frequency also changes. The contact resonance frequency at a certain setpoint may for example be found by sweeping the modulation frequency across a plurality of modulation frequency values, and monitoring the demodulation amplitude or demodulation phase of the output signal. For example, by performing a frequency sweep of the modulation frequency at a plurality of setpoint force values, at finding a modulation frequency for which the amplitude response is at its maximum value (or alternatively or additionally the modulation frequency for which the phase indicates a resonance mode), the optimal modulation frequency associated with each setpoint force value may be found. Therefore, in accordance with an embodiment of the present invention, wherein the acoustic vibration signal comprises a carrier wave signal having a carrier frequency and a modulation signal having a modulation frequency, the method further comprises, at one or more positions of the probe tip relative to the semiconductor element, the steps of controlling a setpoint force such as to consecutively set the setpoint force at a plurality of setpoint force values, and performing, at each setpoint force value, a frequency sweep of the modulation frequency across a plurality of frequencies in a frequency range for associating an optimal modulation frequency with each setpoint force value. The above typically includes ultrasonic force microscopy (UFM). It is to be noted that the method may be performed in various kinds of UFM configurations. These further include, for example, force modulation microscopy and heterodyne force microscopy.

In yet a further non limiting example, the set point force is controlled such as to set the measurement depth to an interface region between the self assembled monolayer and a lower portion or layer of the semiconductor element, to enable simultaneous detection of surface defect and binding strength of the monolayer. In particular, in a preferred embodiment, the semiconductor element comprises at least one of a substrate or one or more device layers, wherein an upper layer of the semiconductor element is provided by the self-assembled monolayer, and wherein the method is performed to simultaneously detect surface defects in the self-assembled monolayer and map a position dependent contact stiffness indicative of a binding strength of the self-assembled monolayer to the semiconductor device.

BRIEF DESCRIPTION OF THE DRAWINGS

The invention will further be elucidated by description of some specific embodiments thereof, making reference to the attached drawings. The detailed description provides examples of possible implementations of the invention, but is not to be regarded as describing the only embodiments falling under the scope. The scope of the invention is defined in the claims, and the description is to be regarded as illustrative without being restrictive on the invention. In the drawings:

DETAILED DESCRIPTION

Figure 1:
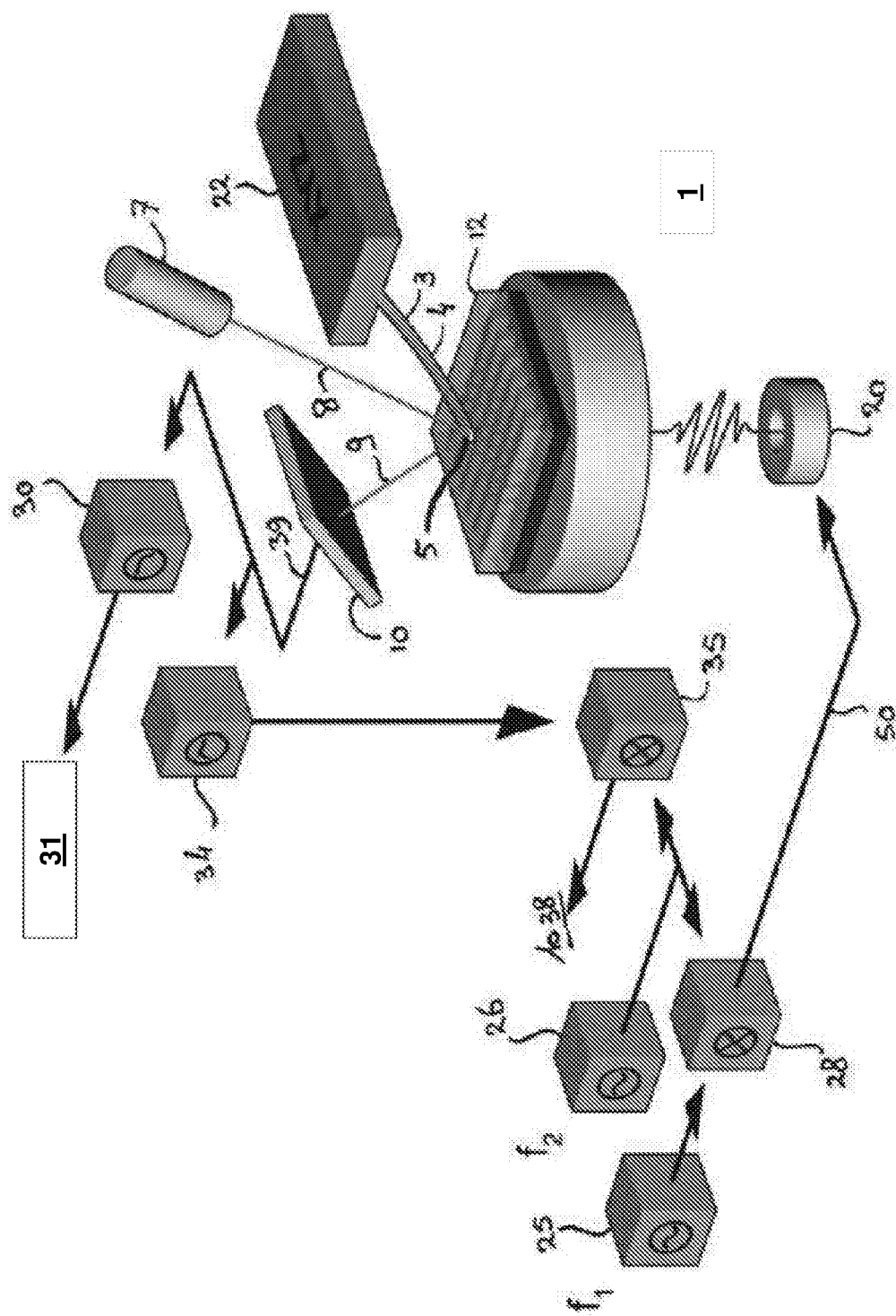
FIG. 1 illustrates an atomic force microscope system including a sample.

FIG. 1 schematically illustrates an atomic force microscopy system (AFM) 1, suitable for use in a method of the present invention and in accordance with an embodiment of the present invention. The system 1 comprises a probe 3 having a cantilever 4 and a probe tip 5. The probe tip 5 is brought in contact with a surface of a sample 12. A light source 7, typically a laser, provides an optical signal beam 8 that is incident on the back of the probe tip 5. A reflected optical beam 9 is received by an optical sensor 10. Any vibration of the probe tip 5 perpendicular to the surface sample 12 will result in a deflection of the reflected optical beam 9. This deflection can be accurately determined by means of optical sensor 10 which provides an (electrical) output signal 39 for further analysis.

The detection method of the present invention applies, in addition to performing surface topography measurements, an acoustic vibration signal to the sample 12, which results in acoustic vibrations at its surface. These vibrations may be sensed by the probe tip 5 with great accuracy. In the system 1 of FIG. 1, a vibrator 20 is arranged underneath the sample 12. A coupling medium 21 (e.g. a liquid, an oil or grease (e.g. vaseline)) provides a low resistance coupling between the acoustic transducer 20 and the sample 12. This allows an acoustic signal produced by the transducer 20 to penetrate the sample 12 from the back side thereof, e.g. in as in the set-up illustrated in FIG. 1. In respect of this, it is noted that it is not essential to the invention to apply the acoustic signal from the back side of the sample 12. The vibrator 20 for applying the acoustic vibration signal may be located elsewhere relative to the semiconductor element 12, enabling the acoustic vibration signal to be applied from any desired direction (e.g. above, below, from aside, or even through another part or entity).

The acoustic vibration signal 50 provided by transducer 20, after penetrating the sample 12, is conveyed through it and produces acoustic vibrations at the surface. These can be sensed by the probe tip 5. By scanning the probe 3 relative to the surface 15, such that the probe tip 5 follows a path on the surface 15 of the semiconductor element 12, the surface topography of the semiconductor element 12 becomes measurable and may be mapped. There are various possibilities for obtaining this information. Primarily, by leading the output signal 39 through low-pass filter 30, the low frequency components of the output signal 39 may be provided to a feedback control system.

The acoustic vibration signal 50 to be provided via the transducer 20 to the semiconductor element 12 consists of a high frequency component $f_1$ and a low frequency component $f_2$, and is created as follows. One or more signal generators comprise at least first frequency generator 25, a second frequency generator 26, and a signal mixer 28. A high frequency input signal component $f_1$ 25 and a low frequency input signal component $f_2$ 26 are mixed by mixer 28 and provided to the transducer 20. The transducer 20, via the coupling medium 21 (which in the present example may be Vaseline), sends the acoustic vibration signal into the sample 12. The sensor signal from optical sensor 10 is provided to a low-pass filter 30 for contact mode feedback, and the output of the low-pass filter 30 is sent to the feedback control system 31. The low pass filter 30 has a cutoff frequency of, for example, around 2 kHz. This is fast enough with respect to the scanning speed, but only slightly higher than the sampling rate (e.g. 1024 pixels in 1 second corresponds to a sampling rate of 1.024 kHz). Feedback control system 31 uses the feedback signal to maintain the AFM system fixed at its setpoint force. The output signal 39 from the optical sensor 10 is further provided to a high-pass filter 34. The high pass filter 34 also has a cutoff frequency of, for example, around 2 kHz, thus thereby transmitting the second fraction of the output signal 39 including the high frequency ultrasound signal (i.e. including component $f_1$) and the low frequency modulation signal (i.e. including component $f_2$) to the demodulator 35. The demodulator 35 further receives the low frequency input signal $f_2$ 26 as a reference signal from the signal generator 29. An output signal of the demodulator 35 is provided to analysis system 38 which allows to analyze the location dependent ultrasound output signal to obtain the subsurface measurement information on the contact stiffness, for enabling binding strength analysis. Frequency generators 25 and 26, mixer 28, demodulator 35, and optionally analysis system 38 may form an integral system.

Figure 2:
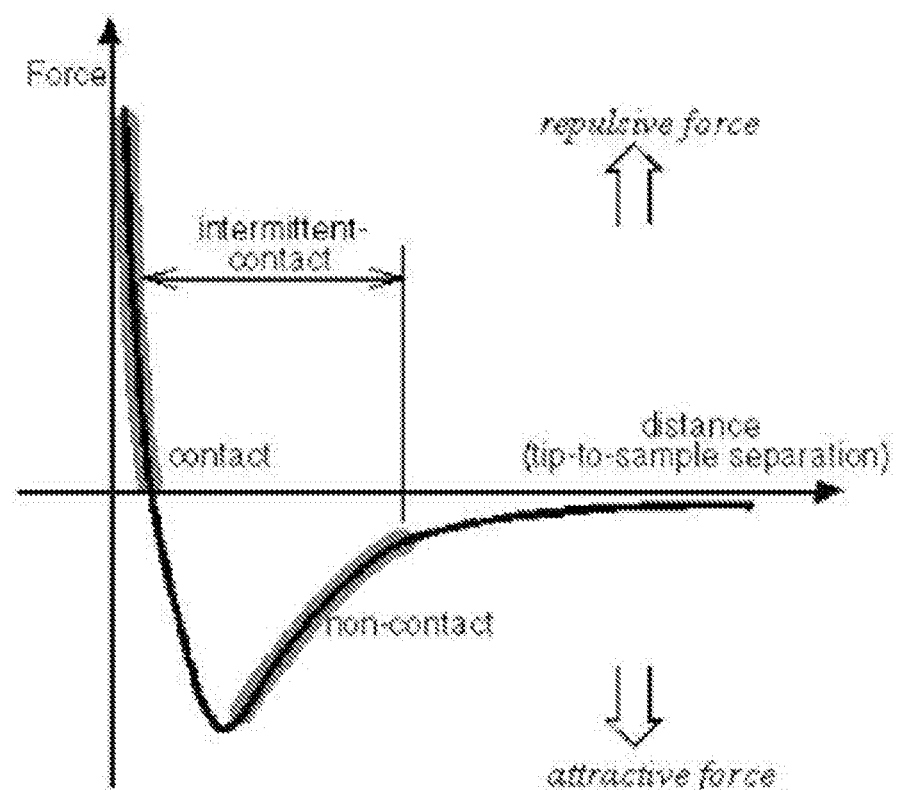
FIG. 2 illustrates a typical force diagram that is registered by the cantilever probe tip.

FIG. 2 shows in more detail the typical force diagram that is registered by the cantilever probe tip 5 in approaching sample 12. In a distant region, the attractive force approaches zero. When approaching the sample 12 in a non-contact phase the probe tip registers an attractive force, that disappears in the contact region. When contacting the sample surface and further diminishing the distance to the sample, the force becomes repulsive and substantially increases.

Figure 3:
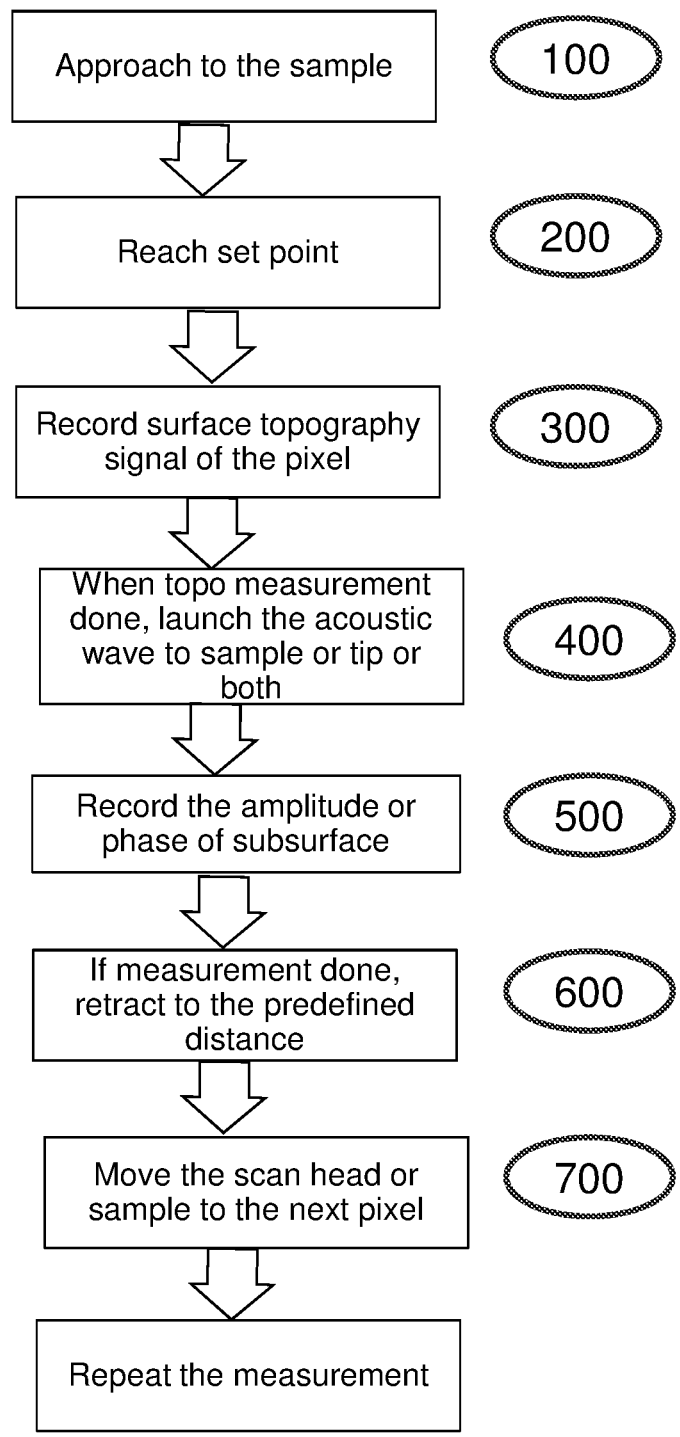
FIG. 3 illustrates a new subsurface AFM mode.

According to an aspect of the invention, a new subsurface AFM mode is proposed as following in FIG. 3. In a first step 100 the probe tip 5 is not resonating and approaches the sample. In this phase, it has a predefined distance from the sample and it approaches the sample until it reaches a set point force 200. Accordingly the height difference is then recorded as the topography information of that pixel. In this phase 300, the sample is not moving as it stands still. Subsequently, as soon as the topography signal is captured, in a next phase 400 an acoustic wave is launched either to sample or tip or both to capture a subsurface signal of the said pixel, which is recorded in a step 500. Subsequently, as soon as the subsurface signal of the said pixel is recorded the cantilever retracts in the next step 600 to the predefined initial distance and the sample or the head moves in step 700 to a next pixel. This process is repeated for as many pixels as need be recorded.

Figure 4:
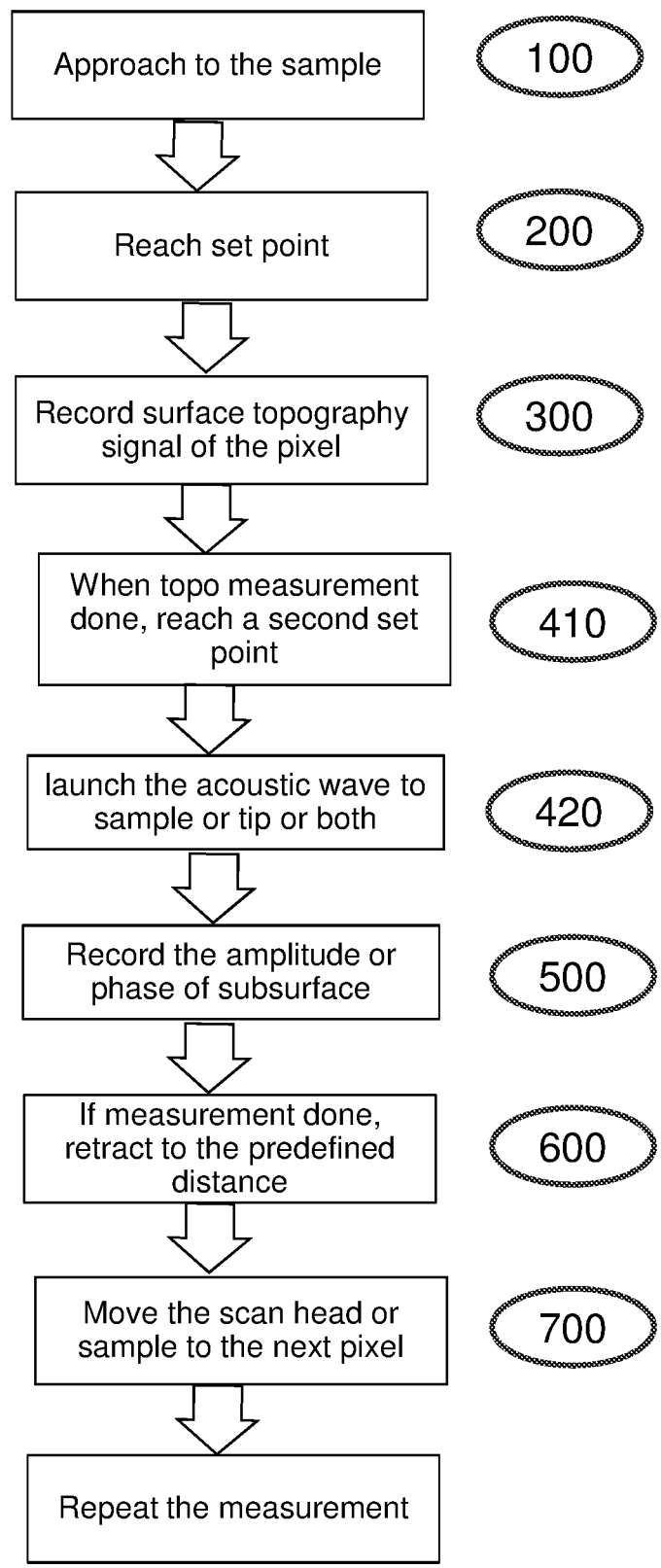
FIGS. 4 and 5 illustrate alternative embodiment steps wherein different setpoints are used.
Figure 5:
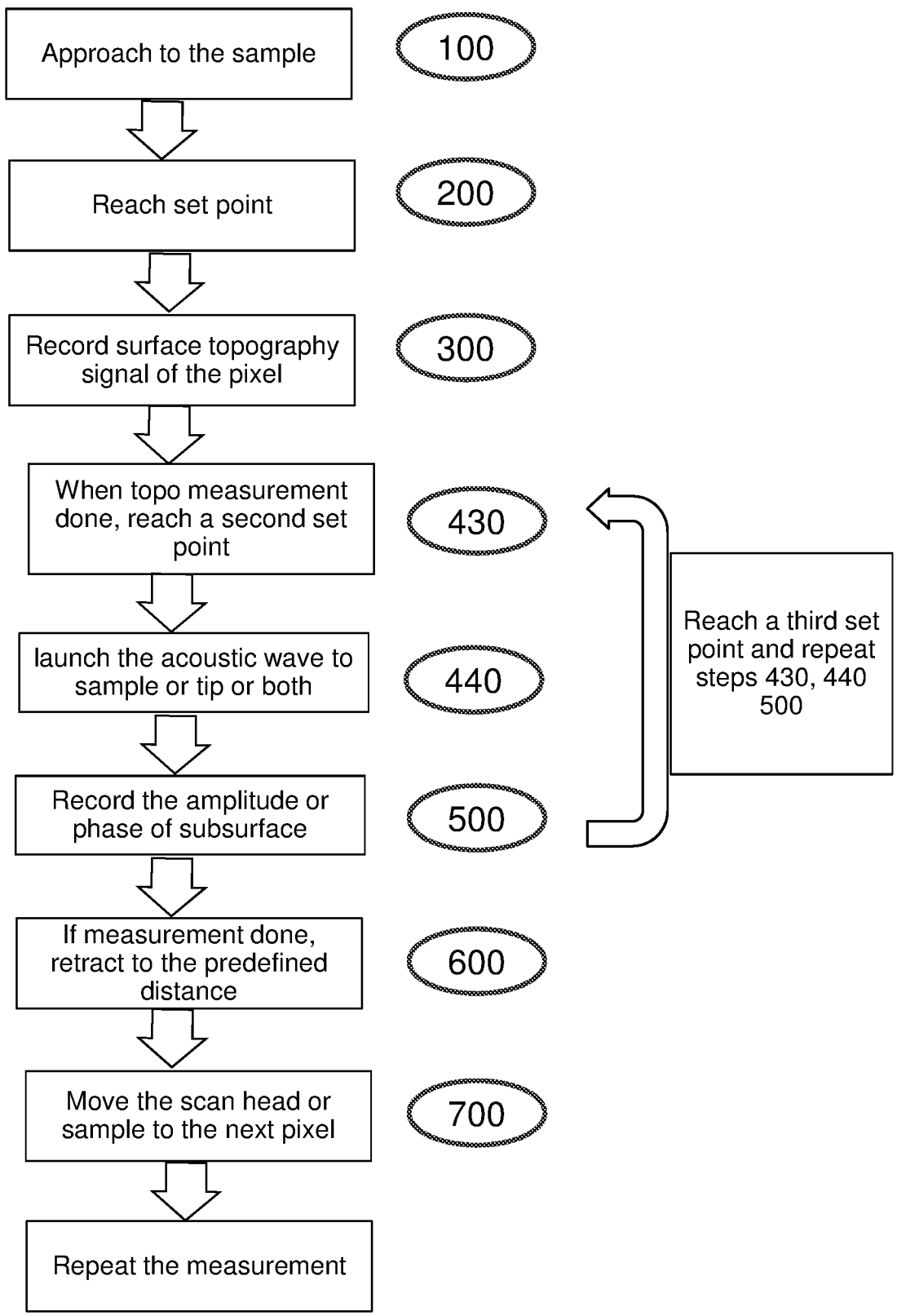

In FIGS. 4 and 5 alternative embodiment steps are shown, wherein different setpoints are used, e.g. for the surface topography recording and the subsurface measurement, and/or where in the sub surface measurement for a single spot measurements are carried out at a number of force set points. Specifically, in FIG. 5 steps 100-300 are identical. Instead of launching the acoustic wave at the designated set point reached in step 200, another set point is reached in step 410. This second set point can be at a higher or lower force set point than the initial first force set point. Subsequently an acoustic wave is launched to the sample or tip or both, in step 420. Subsequently steps 500-700 are identical to steps in FIG. 3.

In FIG. 5 a further variation is shown. In this variation, instead of carrying out a single sub surface measurement at a second set point force (step 430), the measurement steps 430, 440 and 500 are repeated at another set point force. This set point force may be higher or lower than the second set point force. In yet another variation, steps of FIGS. 3 and 5 are combined, for example, a first measurement is carried out at a set point force (step 430) identical to the surface topography recording step 200.

Figure 6:
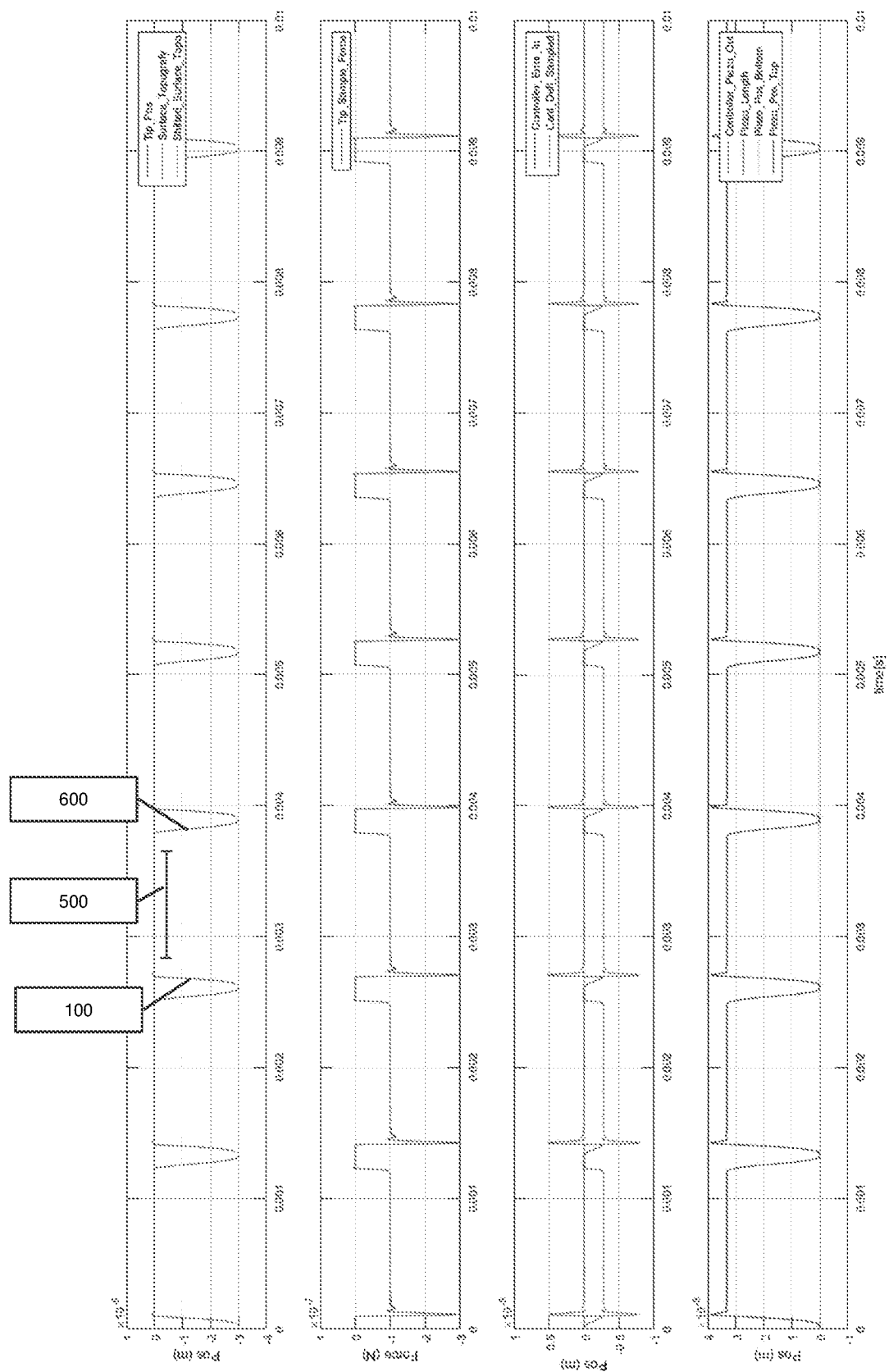
FIG. 6 illustrates a trace diagram for a calculated subsurface mode.

In FIG. 6 a trace diagram is shown for a calculated subsurface mode according to the above steps (for convenience, only this mode is shown). The assumptions are that a measurement cycle is about 1 ms. In the cycle an approach phase the controller 31 moves the cantilever probe tip over a height of 30 nm towards the sample on a new pixel position. In this diagram the tip thus moves (at zero force) away from the surface by 30 nm, i.e. in this period the force is 0 nN. Upon hitting the sample, the feedback has an overshoot, to −300 nN before reaching the setpoint at −100 nN. In the corresponding force diagram, the force changes from about 100 nN to zero N when in the subsurface phase with a peak force of less than 300 nN (nano Newton). Subsequently a sub surface measurement is performed in phase 500. Subsequently in a retract phase 600 the controller 31 moves the cantilever probe tip of 30 nm.

Figure 7:
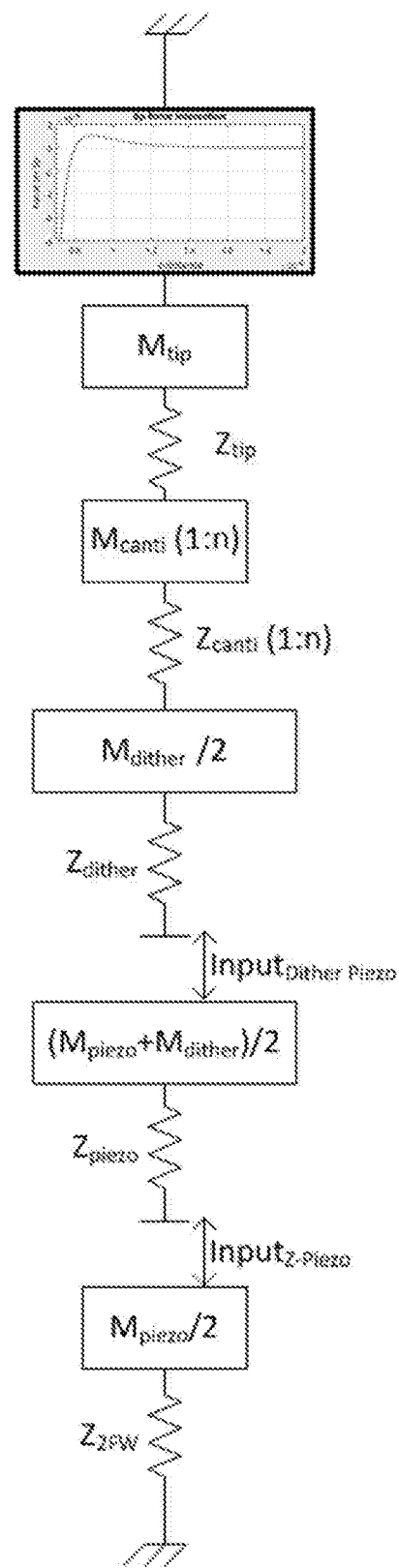
FIG. 7 illustrates corresponding model parameters for the AFM system.

In the examples it is described that the vibrator is provided by an acoustic piezo transducer coupled to the sample. Alternatively, or in addition to it, the cantilever tip can be vibrated. The corresponding dynamic model parameters for the model (see FIG. 7) are Cantilever: eigenfrequency 300 kHz, stiffness 40 N/m, Q-factor 100, split in 11 masses (incl. tip)

Piezo: 3×3×3 mm, density 7800 kg/m3, eigenfrequency≈50 kHz, Q-factor 50

Dither: 3×3×0.3 mm, density 7800 kg/m3, eigenfrequency≈1.2 MHz, Q-factor 50 ('Dither' being piezo driving the cantilever in conventional tapping mode AFM)

Fixed world: eigenfrequency≈1 kHz, Q-factor 30

The present invention has been described in terms of some specific embodiments thereof. It will be appreciated that the embodiments shown in the drawings and described herein are intended for illustrated purposes only and are not by any manner or means intended to be restrictive on the invention. It is believed that the operation and construction of the present invention will be apparent from the foregoing description and drawings appended thereto. It will be clear to the skilled person that the invention is not limited to any embodiment herein described and that modifications are possible which should be considered within the scope of the appended claims. Also kinematic inversions are considered inherently disclosed and to be within the scope of the invention. In the claims, any reference signs shall not be construed as limiting the claim. The term 'comprising' and 'including' when used in this description or the appended claims should not be construed in an exclusive or exhaustive sense but rather in an inclusive sense. Thus the expression 'comprising' as used herein does not exclude the presence of other elements or steps in addition to those listed in any claim. Furthermore, the words 'a' and 'an' shall not be construed as limited to 'only one', but instead are used to mean 'at least one', and do not exclude a plurality. Features that are not specifically or explicitly described or claimed may be additionally included in the structure of the invention within its scope. Expressions such as: "means for . . . " should be read as: "component configured for . . . " or "member constructed to . . . " and should be construed to include equivalents for the structures disclosed. The use of expressions like: "critical", "preferred", "especially preferred" etc. is not intended to limit the invention. Additions, deletions, and modifications within the purview of the skilled person may generally be made without departing from the spirit and scope of the invention, as is determined by the claims. The invention may be practiced otherwise then as specifically described herein, and is only limited by the appended claims.

The invention claimed is:

1. An atomic force microscope comprising:
   a probe comprising a probe tip configured to sense a sample disposed proximate to the probe tip;
   a detector to detect a deflection of the probe tip;
   an actuator coupled to the probe and configured to move the probe in a sense state with the sample at a first predetermined force set point; and
   a vibrator in communication with the sample to provide a vibration having a modulation frequency to the sample,
   wherein the vibrator is controlled to provide the vibration to the sample in a modulation period after an initial sense period without modulation of the sample by the vibrator,
   wherein a surface topography measurement is performed during the initial sense period in which the sample is not modulated,
   wherein a subsurface characterization measurement is performed during the modulation period in which the sample is modulated, and
   wherein the probe is moved during or after said modulation period to a successive sample position over said sample while moving the probe in a non-contact state.

2. The atomic force microscope of claim 1, wherein the actuator is configured to keep the probe in a sense state with the sample at a second force set point, different from the first set point, in the modulation period.

3. The atomic force microscope of claim 1, wherein the vibrator comprises a mechanical transducer.

4. The atomic force microscope of claim 2, wherein the mechanical transducer comprises a piezoelectric transducer.

5. The atomic force microscope of claim 1, wherein the atomic force microscope is configured to displace the sample in a two-dimensional plane.

6. The atomic force microscope of claim 1, wherein the atomic force microscope provides a three-dimensional stiffness or visco elasticity of the sample.

7. A method for performing atomic force microscopy by an atomic force microscope comprising a probe configured to sense a sample disposed proximate to the probe at a first force set point and a vibrator in communication with the sample to provide a vibration having a modulation frequency to the sample, the method comprising:
   sensing, by said probe, the sample at the first force set point in an initial sense period without modulation of the sample by the vibrator;
   subjecting the sample to the vibration in a modulation period after said initial sense period without modulation by the vibrator; thereby modulating the sample at the modulation frequency to perform a subsurface characterization measurement of the sample,
   wherein a surface topography measurement is performed during the initial sense period, and
   wherein the probe is moved during or after said modulation period to a successive sample position over said sample while moving the probe in a non-contact state.

8. The method according to claim 7, wherein during the subjecting the sample to the vibration the sample is subjected to the vibration while sensing the sample, which is disposed proximate to the probe, at the first force set point.

9. The method according to claim 7, wherein the sample is further subjected to the vibration while sensing the sample, which is disposed proximate to the probe, at an another force set point that differs from the first set point.

10. The method according to claim 7, wherein the detecting the deflection of the probe tip comprises at least one of the group consisting of:

using a fraction of a detector output signal;

using a feedback signal indicative of height corrections of the probe tip relative to the surface of the semiconductor element; and obtaining, using a z-level sensor, height measurements of the height of the probe tip relative to the surface of the semiconductor element.

11. The method according to claim 7, wherein the subjecting the sample to the vibration is performed by applying, by the vibrator, an acoustic vibration signal directly to the sample, such as via at least one of the group consisting of: a contact surface located underneath the sample, an upper side of the sample, and a side of the sample.

* * * * *